Figure 1:
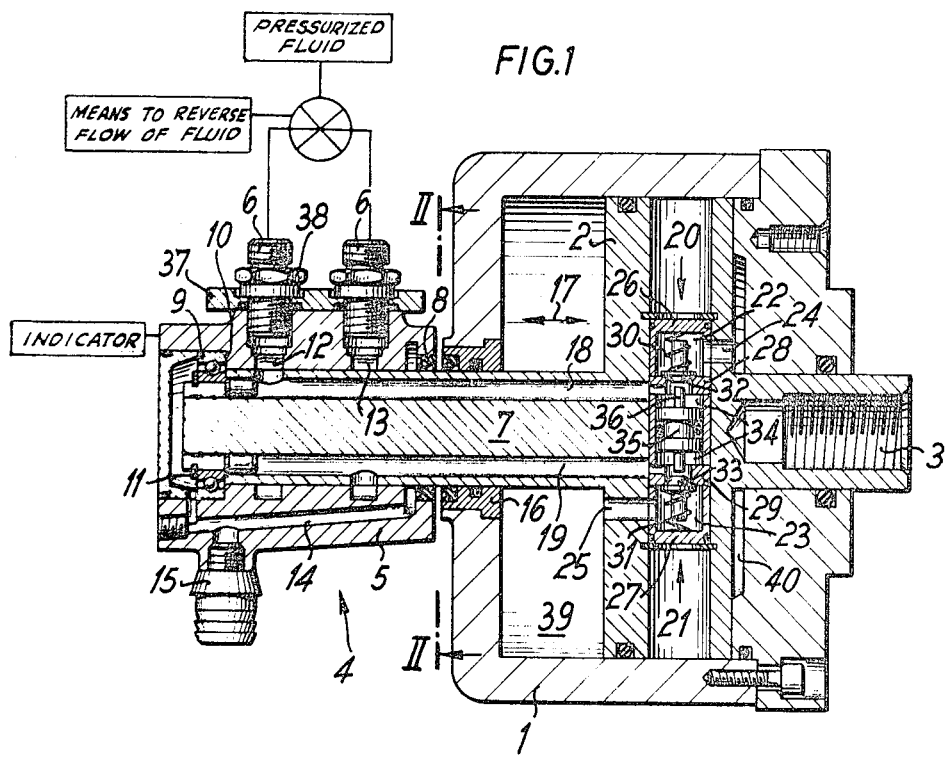

United States Patent
Kodalle

[15] 3,641,875
[45] Feb. 15, 1972

[54] OMNIDIRECTIONAL PRESSURIZED HYDRAULIC AND PNEUMATIC FLUID-ACTUATED PISTON-TYPE POWER MEANS FOR OPERATING MECHANISMS, SUCH AS A CHUCK, BY RECIPROCATING LINEAR MOVEMENTS, OMNIDIRECTIONALLY, WITHIN ANY PLANE

[72] Inventor: Rudi Kodalle, Sontheim am Brenz, Germany

[73] Assignee: Rohm-Gesellschaft m.b.H. Werkzeug- und Maschinenfabrik, Sontheim am Brenz, Germany

[22] Filed: Jan. 23, 1970

[21] Appl. No.: 5,305

[30] Foreign Application Priority Data

Mar. 7, 1969 Germany .................. P 19 11 558.3

[52] U.S. Cl. .................................. 91/1, 91/420, 91/422, 92/106
[51] Int. Cl. ............................. F01b 31/12, F15b 13/042
[58] Field of Search ................ 91/422, 1, 420; 92/106; 279/4

[56] References Cited

UNITED STATES PATENTS

| | | | |
|---|---|---|---|
| 2,964,016 | 12/1960 | Talak | 91/420 |
| 3,126,706 | 3/1964 | Dettinger | 91/420 X |
| 3,303,755 | 2/1967 | Linker et al. | 91/1 X |
| 3,369,464 | 2/1968 | Blattry | 91/420 |
| 3,411,415 | 11/1968 | Benjamin et al. | 91/422 X |

FOREIGN PATENTS OR APPLICATIONS

| | | | |
|---|---|---|---|
| 893,678 | 4/1962 | Great Britain | 91/420 |

Primary Examiner—Edgar W. Geoghegan
Assistant Examiner—Irwin C. Cohen
Attorney—Otto John Munz

[57] ABSTRACT

A hydraulically or pneumatically controlled apparatus for operating a chucking tool on a lathe or other machine tool for clamping and releasing workpieces. Due to its particular structure and especially the particular design and arrangement of its check valves, this apparatus takes up a very small space, and the axial movements of its piston are transmitted to the outside and may be employed for controlling the operations of the machine tool.

9 Claims, 2 Drawing Figures

INVENTOR
RUDI KODALLE

BY [signature]
ATTORNEY

OMNIDIRECTIONAL PRESSURIZED HYDRAULIC AND PNEUMATIC FLUID-ACTUATED PISTON-TYPE POWER MEANS FOR OPERATING MECHANISMS, SUCH AS A CHUCK, BY RECIPROCATING LINEAR MOVEMENTS, OMNIDIRECTIONALLY, WITHIN ANY PLANE

The present invention relates to a rotary chucking cylinder for tightening and releasing a chucking tool of a lathe or other machine tool by means of a pneumatic or hydraulic pressure medium which acts upon a piston which is axially slidable within the cylinder and mounted on a shaft which is connected to and rotatable within a distributor housing. This shaft is provided with two channels each of which has one end communicating with a connection fitting on the distributor housing for the supply and discharge of the pressure medium, while its other end leads to the cylinder chamber at one or the other side of the piston. The flow of the pressure medium through the two channels is controlled by a pair of check valves in such a manner that the supply of pressure medium through one channel opens both check valves and flows into one cylinder chamber and thereby shifts the piston, while the pressure medium which is thereby expelled from the other cylinder chamber flows off through the other channel.

If for any reason the supply of the pressure medium to such a chucking cylinder might drop or be interrupted entirely, both check valves and thus also both cylinder chambers will immediately be closed so that the piston will be locked in a fixed position. Consequently, the chucking tool which is operated by the chucking cylinder will likewise remain in its last position even when the pressure supply drops or ceases entirely so that, if this was its tightened or clamping position, the workpiece will remain tightly clamped therein and cannot fall out.

It is an object of the present invention to provide a chucking cylinder of the type as described above which has the advantage that it is of a much smaller and more compact size than similar apparatus as previously employed by mounting the check valves on the piston of the cylinder and in a manner so as to take up very little space, and that due to this construction the operation of this apparatus is very reliable and it may be manufactured and assembled at a low cost.

A further object of the invention is to design this chucking cylinder so that the movements of its piston are transmitted to the outside where they may be employed for indicating the operating positions of the piston and/or for supervising or controlling the operations of the machine tool, for example, by insuring that certain operations of the machine tool will not be carried out until by the position of its piston the chucking cylinder has indicated that the workpiece is properly clamped by or released from the chucking tool.

According to the invention, these objects are attained by mounting the check valves on the piston within the cylinder so as to be bodily movable with the piston but to operate in a direction transverse to the axial movements of the piston, by mounting the shaft of the piston in which the channels for supplying and discharging the pressure medium are provided so as to be rotatable with the cylinder but slidable in its axial direction in the front and rear walls of the cylinder, and by mounting the distributor housing on this shaft outside of the cylinder so as to be nonrotatable but to be taken along by this shaft when it is moved in its axial direction by the piston.

Since the axial movements of the shaft carrying the piston and containing the channels leading to the check valves in or on the piston are directly transmitted to the distributor housing, the invention further provides that the distributor housing carries or is operatively associated with suitable means for indicating the different operating positions of the piston and/or for employing the movements of the piston for supervising or controlling the operations of the machine tool.

According to the invention, the two check valves are mounted on the piston and each of them comprises a valve cage containing a valve chamber which has an aperture in its bottom forming a valve seat which communicates with one of the channels and is normally closed by a valve plate and may be opened toward the inside of the valve chamber against the action of a spring by the pressure of the pressure medium which is supplied through the mentioned channel and which then flows from the valve chamber through a valve part toward one or the other cylinder chamber.

The two valves may be of an especially simple design if they are combined into a single structural unit which is mounted on the piston so as to extend transverse to its axis so that the two valve chambers are disposed diametrically opposite to each other at both sides of the piston axis and are separated from each other by an intermediate central cylindrical chamber in which a small control piston is slidable which is provided with tappets on its opposite ends. When the pressure medium is supplied through one channel and the associated check valve into one cylinder chamber at one side of the main piston, it also acts at the same time upon the control piston and moves the same in the direction toward the other check valve so that one of the tappets then presses against the valve disk of this other valve and opens the same against the action of its spring. Thus, while the pressure medium flows through the first channel and the first check valve into one cylinder chamber and thereby shifts the piston in one direction, the pressure medium which is expelled by the piston from the other cylinder chamber can pass through the second check valve which has been opened by the tappet on the small control piston and through the second channel in the shaft to the distributor from which it may be discharged through one of the connection fittings thereon. If this first operation of the chucking cylinder was carried out, for example, for clamping a workpiece in the chucking tool and is subsequently to be followed by a second operation of the chucking cylinder in which the main piston is moved in the opposite direction, for example, for releasing the workpiece from the chucking tool, the pressure medium is passed through the second channel in the shaft and flows through the second check valve into the cylinder chamber at the rear of the piston, while at the same time this pressure medium also acts upon the small control piston which by its tappet then opens the first check valve so that, while the main piston moves forwardly, the pressure medium which is expelled from the cylinder chamber in front of this piston passes through the first check valve and the associated channel toward and from the distributor.

Another feature of the invention consists in mounting the mentioned check valve unit in a very simple manner on the main piston by providing the latter with a bore which extends transverse to the piston axis and into which the mentioned valve unit is to be inserted, by extending the two channels of the piston shaft for the pressure medium so that their front ends terminate into this bore, by providing in each side of the piston a short axial bore which terminates into the transverse bore into which the valve unit is inserted and then connects the valve part of one of the other check valves with one cylinder chamber or the other.

The distributor housing which is mounted on and movable in the axial direction together with the piston shaft but is nonrotatable is provided with two connection fittings each of which communicates at the inside of the housing with one of the channels of the shaft through either of which the pressure medium may at one time be supplied to one of the channels or the other, while the return flow of the expelled pressure medium passes through the other channel and the other connection fitting on the distributor housing.

On its outside, this distributor housing may be provided with means for indicating the operating positions of the chucking cylinder and thus also of the chucking tool and/or with means for employing the axial movements of the distributor housing for supervising or controlling the operations of the machine tool. These means which may consist, for example, of suitable cams, electric switch means or switch-actuating means, or the like are preferably mounted on the distributor housing so as to be easily exchangeable. For this purpose, the connection fittings on this housing for supplying and discharging the pressure medium may also be designed so as to permit these indicating or control means to be removably mounted thereon.

Figure 2:
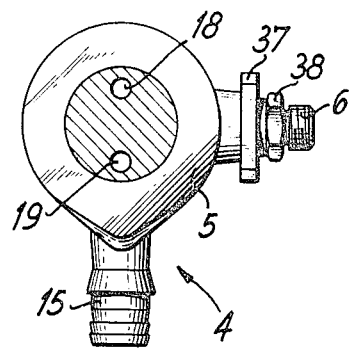

The features and advantages of the present invention will become further apparent from the following detailed description thereof which is to be read with reference to the accompanying drawings, in which:

FIG. 1 shows a central longitudinal section of a chucking cylinder according to the invention, in which for a better illustration the connection fittings on the distributor housing are turned at an angle of 90° to their preferred position as shown in FIG. 2; while FIG. 2 shows a cross section which is taken along the line II—II of FIG. 1.

Referring to the drawings, the chucking cylinder according to the present invention which serves for tightening and releasing a chucking tool (not shown) of a lathe or other machine tool comprises a cylinder 1 which forms an outwardly sealed housing, a piston 2 which is axially slidable within cylinder 1 but rotatable together with the cylinder, and a shaft 7 which is secured to or integral with piston 2 and projects from both sides of the piston and extends slidably through the rear wall and the cover of cylinder 1 to the outside. The forwardly projecting end of shaft 7 is provided with a tapped bore into which the threaded end of a tie rod (not shown) of the chucking tool may be screwed which usually extends through the hollow spindle of the machine tool to the rear end of which the cover of cylinder 1 is to be secured so that cylinder 1 together with piston 2 and shaft 7 will be rotated by the spindle.

By means of shaft 7, cylinder 1 is connected to a distributor which is generally designated by the numeral 4 and comprises a distributor housing 5 which is mounted so as not to be rotatable with shaft 7 but connected to the latter so as to follow its movements in axial directions. For this purpose shaft 7 is rotatably mounted within housing 5 on bearings 8 and 9 and bearing 9 abuts at one side against a shoulder 10 on the inner wall of housing 5, while its other side abuts against a spring ring 11 on the rear end of shaft 7 so that housing 5 is substantially immovable in its axial direction relative to shaft 7. This shaft which carries the piston 2 is axially slidable through bores in the cover and rear wall of cylinder 1 and is sealed relative to the outside by suitable gaskets 16 in this cover and rear wall. Any axial movement of piston 2 in the direction of the double arrow 17 as shown in FIG. 1 will therefore be positively transmitted by shaft 7 to the distributor housing 5.

On its inner side, housing 5 is provided with a pair of annular grooves 12 and 13 which directly communicate with connection fittings 6 through either of which the pressure medium, for example, compressed air or oil, is supplied or discharged. If the chucking cylinder is operated hydraulically, any oil which might leak through the joints between shaft 7 and housing 5 will be collected in a channel 14 in the wall of the housing from which it is discharged through an outlet connection 15.

Shaft 7 is provided with two channels 18 and 19 which extend longitudinally through this shaft from its rear end and terminate into a transverse bore in piston 2 into which a pair of check valves are to be inserted and which communicates through a bore 24 with the cylinder chamber 40 in front of the piston 2 and through another bore 25 with cylinder chamber 39 at the rear of the piston. The part of shaft 7 which extends into the distributor housing 5 is provided with a bore in the wall of each channel 18 and 19 which directly communicates with the annular groove 12 or 13 with which one or the other connection fitting 6 is connected in the inner wall of housing 5.

For controlling the flow of the pressure medium into or from the two pressure chambers 39 and 40 in cylinder 1 at the opposite sides of piston 2, a pair of check valves, generally designated by the numerals 20 and 21, are mounted on piston 2. According to a preferred embodiment of the invention as illustrated in the drawings, piston 2 is for this purpose provided with a bore which extends transverse to the axis of shaft 7. Channels 18 and 19 terminate at their front ends into this bore which communicates with chambers 39 and 40 through the axial bores 25 and 24, respectively, which extend in opposite directions through the wall of the transverse bore into these chambers. Since, as subsequently described in detail, a small control piston 35 is inserted into the transverse bore in a position between the front ends of the two channels 18 and 19, channel 18 is adapted to communicate through check valve 20 and bore 24 only with the cylinder chamber 40 in front of piston 2, while channel 19 can communicate through check valve 21 and bore 25 only with the cylinder chamber 39 at the rear of piston 2 when the respective check valve is opened.

Each check valve 20 and 21 consists of a valve cage 26 or 27 which encloses a valve chamber 22 or 23, respectively. The bottom of each of these cages is provided with a bore forming an inner valve seat 28 or 29 which is normally closed by a valve plate 32 or 33 under the action of a spring 30 or 31 and is adapted to be opened toward the inside of the respective valve chamber if a pressure medium, for example, compressed air or oil, is supplied through channel 18 or 19 under a sufficient pressure to overcome the strength of spring 30 or 31. By being mounted in the transverse bore, the two check valves 20 and 21 are disposed diametrically opposite to each other relative to the axis of piston 2 and thus take up a very small space. As already mentioned, a small control piston 35 is located in the transverse bore between the front ends of channels 18 and 19 and it is slidable within a cylinder chamber 34 in the direction toward one or the other check valve 20 or 21. Each end of this small piston is provided with a projecting tappet 36 which is adapted to hit against the adjacent valve plate 32 or 33 and to lift the same off its seat 28 or 29 against the action of spring 30 or 31 when a pressure medium of a sufficient pressure is supplied through the channel 18 or 19 which terminates into the transverse bore adjacent to the opposite end of piston 35.

According to a preferred embodiment of the invention as illustrated in FIG. 1, the two check valves 20 and 21 and the small piston 35 may be combined into a structural unit which may be inserted into one end of the transverse bore and be locked in the proper position therein by a pair of spring rings or similar means at the opposite ends of this unit. The common tubular wall which combines the two valve cages 26 and 27 also forms the cylinder for chamber 34 for the small control piston 35. Of course, this wall is provided with valve ports which are respectively in axial alignment with the bores 24 and 25 and with the front ends of the channels 18 and 19. It is evident that by combining the check valves 20 and 21 and the control piston 35 into a single structural unit prior to the assembly of the entire apparatus, it is much easier to mount these elements accurately in their proper positions than it would be if they had to be mounted individually on or in the piston 2.

For employing the distributor housing 5 for indicating the operative positions and axial movements of piston 2 or for transmitting these movements to suitable control means, for example, for controlling the operations of the machine tool to which the chucking cylinder according to the invention is connected or even for controlling the operations of the chucking cylinder and its piston in timed relation with the machining operations of the machine tool, the connection fittings 6 and their screw connections 38 on the distributor housing 5 may be employed, for example, for removably securing suitable cam means 37 thereto so as to permit them to be easily exchanged for others.

The mode of operation of the apparatus as previously described is as follows:

If the pressure medium such as oil or compressed air, is supplied, for example, through the connection fitting 6 leading to the annular groove 13, it passes through the channel 18 in shaft 7 and, if it has a sufficient pressure, it opens the check valve 21 so that it will then pass through the valve chamber 23 and valve part 5 into the cylinder chamber 39 behind the piston 2 and thereby move the latter forwardly. At the same time, the pressure medium also acts upon the control piston 35 so as to shift the same in the chamber 34 toward the check valve 20, whereby the tappet 36 hits against the valve plate 32 and lifts it off its seat 28 so that the pressure medium which is expelled from the cylinder chamber 40 by the forward movement of piston 2 can flow off through valve port 24, valve chamber 22, channel 18, the annular groove 12 and the associated connection fitting 6 until piston 2 arrives in its final forward position as shown in FIG. 1.

If piston 2 is to be retracted from this position, for example, for tightening the chucking tool (not shown) so as to clamp a new workpiece, the operation of the chucking cylinder has to be reversed by reversing the circuit of the pressure medium which then has to be supplied through channel 18 so as to open the check valve 20 and to flow through valve chamber 22 and valve port 24 into the cylinder chamber 40 in front of piston 2. At the same time, the pressure medium also shifts the control piston 35 in the direction toward check valve 21 so that its tappet 36 opens this valve and thus permits the pressure medium to be expelled from cylinder chamber 39 through valve port 25, valve chamber 23, channel 19, the annular groove 13 and the associated connection fitting 6 to the same extent as it is supplied into chamber 40.

It is evident from the preceding description that, if any failure occurs in the supply of pressure medium to one or the other channel 18 or 19 or if the pressure of this medium drops below a certain value, both check valves will be immediately closed by the valve springs 30 and 31 and the back pressure in chambers 39 and 40 acting upon valve plates 32 and 33, and piston 2 will remain in a locked position in cylinder 1. Consequently, the chucking tool will likewise remain in its previous condition and a workpiece which is clamped therein will not be released.

Since due to the means 9 to 11 the distributor housing 5 must follow any axial movements of shaft 7 and piston 2, each movement may be transmitted by the cam or other means 37 on housing 5 to effect suitable control functions.

Although my invention has been illustrated and described with reference to the preferred embodiment thereof, I wish to have it understood that it is in no way limited to the details of such embodiment but is capable of numerous modifications within the scope of the appended claims.

Having thus fully disclosed my invention, what I claim is:

1. An omnidirectional pressurized hydraulic and pneumatic fluid-actuated piston-type power means for operating mechanisms, such as chuck, by reciprocating linear movements, omnidirectionally, within a plane, comprising:
   a revolving chucking cylinder and piston unit having a front and rear piston chamber and a piston shaft;
   a nonrotating reciprocating pressurized fluid supply and discharge means mounted on said shaft;
   a single secondary control valve unit within said piston to control the flow of said pressurized fluid alternately in the said front and rear piston chambers and simultaneously the discharge of the pressurized fluid from the opposite cylinder chamber, said chucking cylinder and piston unit comprising:
   an outwardly closed cylinder having front and rear walls, each of said walls having a central bore;
   a piston axially slidable in and rotatable with said cylinder and dividing the inside of said cylinder into said front chamber and said rear chamber;
   said shaft coaxially connected with said piston and having a front section and a rear section secured to the opposite sides of said piston and axially slidable in said central bores of said front and rear walls;
   sealing means between said walls and said shaft for sealing said chambers;
   said rear section of said shaft having a pair of longitudinal channels, a supply channel and a return channel therein;
   said pressurized fluid means to alternately pressurize and discharge each of said channels, one to serve as a supply channel and the other as a return channel simultaneously;
   said control valve unit comprising pair of check valves mounted in said piston;
   resilient means for normally maintaining said valves in a closed position;
   each of said valves being associated with one of said channels and one of said chambers;
   actuating means to alternately open said valves against the action of said resilient means if acted upon by said pressurized fluid means passing through said channels when serving as a supply channel, so that said fluid means then flows through said valve onto one of said chambers and thereby acts upon said piston so as to move the same in one axial direction;
   said actuating means also responsive to the pressure of said fluid means passing through said supply channel for acting upon and to open the other check valve so that said pressurized fluid contained in the other chamber flows out of it and through said other check valve and said return channel;
   said nonrotating supply and discharge means connected to a part of the rear section of said shaft outside of said cylinder and movable in the axial direction with said shaft for alternately supplying said pressurized fluid to one of said channels and for alternately discharging the return flow of said fluid from said other channel.

2. A power means as defined in claim 1, each of said check valves comprising a valve chamber having a first wall with a first bore therein forming valve seat at the inner side of said valve chamber, and having a second wall with a second bore therein;
   said first bore of one valve member communicating at the outside thereof with one of said channels, and said first bore of the other valve chamber communicating at the outside thereof with the other channel, said second bore of one valve chamber communicating with one cylinder chamber, and said second bore of the other valve chamber communicating with the other cylinder chamber;
   a movable valve member in each of said valve chambers, and a compression spring in each of said valve chambers acting upon said valve member and pressing the same upon said valve seat.

3. A power means as defined in claim 2, check valves mounted on said piston in such a position that said valve members are movable in directions at right angles to the axis of said piston and shaft.

4. A power means as defined in claim 3, said second walls of both of said check valves forming a part of a common tubular member secured to said piston and having closed ends, and combing said check valves and said actuating means to form a structural unit;
   said first walls of both of said check valves forming transverse partitions in said tubular member and spaced from each other by a central cylindrical part of said tubular member;
   said actuating means consisting of a control piston slidable in said cylindrical part and having a tappet on each end adapted to hit against the adjacent valve member to lift same off its seat, whereby when said pressurized fluid is supplied through said supply and discharge means and one of said channels and opens one of said check valves and flows into one of said cylinder chambers, it also shifts said control piston in the opposite direction to the opening movement of said check valve and said control piston by one of its tappets thereby opens the other check valve permitting at least some of the pressurized fluid in the other cylinder chamber to flow out of it and to be discharged through said other check valve, said other channel, and said supply and discharge means.

5. A power means defined in claim 4, said piston having a transverse bore extending transversely to the axis of said piston and shaft, said valve unit being inserted into and secured in a fixed position in said bore, said piston having a pair of axial bores in its opposite sides and terminating into said transverse bore and each being in alignment with said second bore in the wall of one of said valve chambers, so that each cylinder chamber is in communication through said aligned bores with the associated valve chamber.

6. A power means as defined in claim 1, in which the rear section of said shaft outside of said cylinder has a pair of transverse bores each extending from the peripheral surface of said shaft into one of said channels, said nonrotatable supply and discharge means comprising a housing surrounding said outer rear section and having a pair of annular grooves in its inner wall, each of said annular grooves being in direct communication with one of said transverse bores in said shaft, and a pair of connection fittings on said housing for supplying and discharging said pressure medium to and from said channels through said transverse bores in said shaft and said annular grooves in said housing.

7. A power means as defined in claim 9, further comprising externally mounted mechanical indicating means relative to said fluid supply and discharge unit and actuated thereby for monitoring the axial positions of said piston relative to said cylinder.

8. A power means as defined in claim 6, further comprising means on said housing for connecting control means thereto.

9. A power means as defined in claim 8, in which at least one of said connection fittings also serves for connecting said control means to said housing.

* * * * *